United States Patent
Asgar Pour Khezer Abad

(10) Patent No.: US 11,035,436 B2
(45) Date of Patent: Jun. 15, 2021

(54) CHAIN ELEMENT

(71) Applicant: Schaeffler Technologies AG & Co. KG, Herzogenaurach (DE)

(72) Inventor: Monir Asgar Pour Khezer Abad, Calais (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 865 days.

(21) Appl. No.: 15/028,287

(22) PCT Filed: Oct. 14, 2014

(86) PCT No.: PCT/DE2014/200549
§ 371 (c)(1),
(2) Date: Apr. 8, 2016

(87) PCT Pub. No.: WO2015/081938
PCT Pub. Date: Jun. 11, 2015

(65) Prior Publication Data
US 2016/0245367 A1    Aug. 25, 2016

(30) Foreign Application Priority Data

Dec. 4, 2013   (DE) ..................... 10 2013 224 851.2

(51) Int. Cl.
*F16G 13/06*    (2006.01)
*C21D 9/00*    (2006.01)
(Continued)

(52) U.S. Cl.
CPC .............. *F16G 13/06* (2013.01); *B21L 15/00* (2013.01); *C21D 1/06* (2013.01); *C21D 1/18* (2013.01);
(Continued)

(58) Field of Classification Search
CPC ......... C22C 38/04; C22C 38/02; C22C 38/06; C21D 2211/008; C21D 9/0087
(Continued)

(56) References Cited

U.S. PATENT DOCUMENTS 1,551,764 A * 9/1925 Muller ................. C21D 9/0087
148/211
4,404,044 A * 9/1983 Warchol .................. C21D 1/60
148/28
(Continued)

FOREIGN PATENT DOCUMENTS

CN            85100188 A      8/1988
DE         102009008480      8/2010
(Continued)

OTHER PUBLICATIONS

M S Rashid: "Dual Phase Steels", Annual Review of Materials Science, vol. 11, No. 1, Aug. 1, 1981 (Aug. 1, 1981).

*Primary Examiner* — Henry Y Liu
(74) *Attorney, Agent, or Firm* — Davidson, Davidson & Kappel, LLC

(57) ABSTRACT

Disclosed is a chain element (2), in particular for a power transmission chain of a chain drive, made of a carbon-containing material, especially steel, characterized by a core layer (5) that has a ferritic matrix structure including at least one hard phase that is distributed therein, and a hardened peripheral layer (6) that has a martensitic structure.

13 Claims, 2 Drawing Sheets

(51) Int. Cl.
  *C21D 1/18* (2006.01)
  *F16G 13/02* (2006.01)
  *F16G 13/04* (2006.01)
  *B21L 15/00* (2006.01)
  *C21D 1/06* (2006.01)

(52) U.S. Cl.
  CPC ........... *C21D 9/0087* (2013.01); *F16G 13/02* (2013.01); *F16G 13/04* (2013.01); *C21D 2211/005* (2013.01); *C21D 2211/008* (2013.01); *C21D 2221/10* (2013.01)

(58) Field of Classification Search
  USPC .......................................................... 474/206
  See application file for complete search history.

(56) References Cited

U.S. PATENT DOCUMENTS

| | | | | |
|---|---|---|---|---|
| 5,201,363 | A * | 4/1993 | Demarez | B22D 11/0622 164/480 |
| 5,462,808 | A * | 10/1995 | Asabe | C21D 8/005 428/548 |
| 5,651,938 | A * | 7/1997 | Thomson | B27B 33/14 420/119 |
| 5,759,309 | A * | 6/1998 | Watts | C21D 1/02 148/637 |
| 5,772,957 | A * | 6/1998 | Thomson | B27B 33/14 148/335 |
| 5,997,662 | A * | 12/1999 | Norio | C21D 9/0087 148/319 |
| 8,407,978 | B2 * | 4/2013 | Hahn | F16G 13/06 148/219 |
| 8,425,691 | B2 * | 4/2013 | Moyer | C23C 8/22 148/223 |
| 2001/0024621 | A1 * | 9/2001 | Leppanen | C22C 38/04 420/8 |
| 2002/0031687 | A1 * | 3/2002 | Wang | C23C 12/02 428/698 |
| 2002/0068654 | A1 * | 6/2002 | Baumann | B21L 15/005 474/215 |
| 2005/0109428 | A1 * | 5/2005 | Charton | C21D 9/0087 148/319 |
| 2005/0233134 | A1 * | 10/2005 | Kanai | C09D 5/18 428/328 |
| 2006/0144482 | A1 * | 7/2006 | Moulin | C21D 8/0236 148/603 |
| 2006/0207690 | A1 * | 9/2006 | Locke | C23C 8/22 148/233 |
| 2007/0111835 | A1 * | 5/2007 | Ogo | F16G 13/04 474/213 |
| 2009/0107588 | A1 * | 4/2009 | Allain | C21D 1/19 148/547 |
| 2011/0168300 | A1 * | 7/2011 | Moulin | C21D 8/0278 148/522 |
| 2011/0308227 | A1 * | 12/2011 | Hahn | F16G 13/06 59/8 |
| 2012/0180909 | A1 * | 7/2012 | Ono | C21D 8/0236 148/504 |
| 2012/0247619 | A1 * | 10/2012 | Obayashi | C21D 1/06 148/233 |
| 2013/0126048 | A1 * | 5/2013 | Moyer | C22C 33/0285 148/218 |
| 2013/0266798 | A1 * | 10/2013 | Cheney | B23K 35/30 428/328 |
| 2013/0266820 | A1 * | 10/2013 | Kusinski | C22C 38/04 428/682 |
| 2014/0083571 | A1 * | 3/2014 | Francis, Jr. | C21D 1/42 148/574 |
| 2014/0141912 | A1 * | 5/2014 | Baba | C21D 9/0087 474/206 |
| 2015/0147591 | A1 * | 5/2015 | Cheney | B32B 15/011 428/682 |
| 2015/0284817 | A1 * | 10/2015 | Snyder | C22C 38/20 148/318 |
| 2016/0060721 | A1 * | 3/2016 | Nagao | C22C 38/00 148/547 |

FOREIGN PATENT DOCUMENTS

| | | |
|---|---|---|
| GB | 952207 | 3/1964 |
| GB | 2406891 | 4/2005 |
| JP | S96367 | 1/1984 |

* cited by examiner

CHAIN ELEMENT

The present invention relates to a chain element which is made of a carbon-containing material, in particular steel.

BACKGROUND

Generic chain elements are used, for example, as chain drives or parts of corresponding chain drives for the purpose of transmitting power and are used in a large number of different technology fields, such as the field of automotive engineering. Due to the high mechanical stresses prevailing during their operation, chain elements of this type are usually made of particularly highly mechanically stressable steels.

To counteract the formation of application-induced signs of friction and wear, common chain elements are regularly in need of improvement with regard to the property combination of ductility, hardness, strength, and toughness.

SUMMARY OF THE INVENTION

An object of the present invention is to provide an improved chain element.

The present invention provides a chain element of the type mentioned at the outset, which, according to the present invention, is characterized by a core layer, which has a structure made of a ferritic matrix with at least one hard phase distributed therein and a hardened peripheral layer having a martensitic structure.

The chain element according to the present invention is, in principle, made of a carbon-based material. It may be, in particular, an unalloyed or alloyed steel. It is also possible to influence the range of properties of the material forming the chain element according to the present invention in house by adding certain alloying elements, i.e., in particular to adapt them with regard to a certain application situation of the chain element.

However, the material forming the chain element must be modified, in particular thermally or thermochemically, in such a way that a core layer and a peripheral layer surrounding the core layer are formed. The peripheral layer of the chain element according to the present invention directly abuts the core layer. The peripheral layer therefore forms the outer area or surface of the chain element according to the present invention, which is exposed to the outside.

The core layer has a structure which includes a ferritic matrix with at least one hard phase distributed therein. The structure of the core layer is thus essentially an at least two-phase structure. The ferritic matrix is made of ferrite or essentially contains ferrite. The ferrite lends the core layer, and therefore also the chain element according to the present invention, a special ductility and toughness due to its comparatively low hardness. Since the hard phase is significantly harder than the ferritic matrix, the hard phase is distinguished from the ferritic matrix, in particular, by its hardness.

The hardened peripheral layer has a martensitic structure. The structure of the peripheral layer is thus essentially a single-phase structure. The peripheral layer is made of martensite or contains a significant proportion of martensite. The martensitic structure lends the peripheral layer, and thus also the chain element according to the present invention, a great hardness. Since the peripheral layer is significantly harder than the core layer, the hardened peripheral layer is distinguished from the core layer, in particular by its hardness.

Due to its special structural configuration, including a core layer having a structure made of a ferritic matrix, which includes at least one hard phase distributed therein and a hardened peripheral layer having a martensitic structure, the chain element according to the present invention has a special property combination of ductility, hardness, strength and toughness. The characteristic of the individual properties may be influenced or controlled, in particular during the course of manufacturing the chain element according to the present invention.

The hardened peripheral layer may be formed with the aid of a martensitic transformation of at least the areas of the chain element near the surface. To form the hardened peripheral layer, therefore, the chain element is advantageously subjected to a measure for transforming a non-martensitic structure into a martensitic structure. As is apparent in the following, a measure of this type may be, for example, an abrupt cooling, i.e., quenching, of a chain element which was previously heated above the austenitization temperature.

The hard phase distributed in the core layer may also be formed from martensite or contain martensite. The structure of the hard phase may thus also be martensitic. Accordingly, the structure of the core layer may correspond to a structure of a dual-phase steel whose structure is typically characterized by a ferritic matrix, including martensitic structures distributed therein, in particular in the manner of islands. The ratio between the ferritic structure and the martensitic structure may be, for example, 80% matrix/20% martensitic hard phase. The proportion of the martensitic hard phase should not exceed 20%. A core layer formed according to a dual-phase steel lends the chain element according to the present invention a comparatively low yield point, and therefore one which is favorable for forming processes, and a comparatively high tensile strength.

The hardened peripheral layer may have a hardness of 600 HV to 1,800 HV (Vickers hardness), in particular greater than 1,000 HV. The comparatively great hardness of the hardened peripheral layer significantly contributes to the wear resistance of the chain element according to the present invention. Of course, the hardness of the peripheral layer may also be below 600 HV or above 1,800 HV in exceptional cases.

The chain element according to the present invention may be, for example, a chain link (chain plate) or a chain sleeve or a chain stud. Of course, the chain element according to the present invention may also be other components of a chain, in particular a transmission chain, such as a tooth chain.

The present invention furthermore relates to a method for manufacturing a chain element made of a carbon-containing material, in particular steel, which includes a core layer having a structure of a ferritic matrix with at least one hard phase distributed therein and a hardened peripheral layer having a martensitic structure. The method according to the present invention is thus used, in particular, to manufacture a chain element according to the present invention.

The method according to the present invention includes the following steps:
  providing a chain element made of a carbon-containing material, in particular steel;
  heating the chain element to and holding it at a temperature above the austenitization temperature of the material forming the chain element in such a way that a uniform austenite phase is formed;
  carrying out at least one measure for introducing carbon into areas of the chain element near the surface;

quenching the chain element in such a way that a core layer is formed, which has a structure made of a ferritic matrix with at least one hard phase distributed therein and a hardened peripheral layer having a martensitic structure.

In a first step of the method according to the present invention, a chain element made of a carbon-containing material is initially provided. The chain element provided or to be provided is typically made of a hardenable steel. It may be an unalloyed or alloyed steel. The chain element may be, for example, a chain link (chain plate) or a chain sleeve or a chain stud.

In a second step of the method according to the present invention, the chain element is heated to a temperature above the austenitization temperature of the material forming the chain element, i.e., typically above 723° C., and held there so that a uniform austenite phase is formed. The structural condition of the chain element is thus austenitized and homogenized until an (essentially) uniform austenitic structure is present.

Specific temperatures and holding times depend on the specific chemical composition, in particular the proportionate chemical composition, of the source material forming the chain element as well as on the desired chemical composition, in particular the desired proportionate composition, of the chain element to be manufactured.

The chain element is typically heated to a temperature in a range between 830° C. and 1,000° C., in particular above 830° C. The chain element is typically held at the temperature above the austenitization temperature for 10 to 60 minutes. In exceptional cases, of course, deviations from the specified values may occur for both the temperature and the holding period. The essential point is that a uniform transformation of the structure of the chain element into an austenitic phase takes place.

In a third step of the method according to the present invention, at least one measure is carried out for introducing carbon into areas of the chain element near the surface. In addition to carbon, additional elements may be introduced into the areas of the chain element near the surface. It is essential for the third step that an enrichment of carbon in the surface or in the areas of the chain element near the surface takes place, which represents the basis for the following formation of the hardened peripheral layer of the chain element to be manufactured.

The measure for introducing carbon into areas of the chain element near the surface may be, for example, carburization (a carburizing process). During the course of the carburization, solid, liquid or gaseous carbonizing agents may be used. The measure may also be, for example, a carbonitriding process, i.e., a special form of case-hardening, in which not only carbon but also nitrogen is introduced into areas of the chain element near the surface.

In a fourth step of the method according to the present invention, the chain element is cooled or quenched in such a way that a core layer is formed, which has a structure made of a ferritic matrix with at least one hard phase distributed therein, and which, in particular, is also made of martensite or contains martensite, and a peripheral layer having a martensitic structure. The formation of different structures in the core layer and the peripheral layer, due to the quenching, is caused by the prior enrichment with carbon of the areas of the chain element near the surface and forming the peripheral layer, so that a martensitic transformation particularly favorably takes place, due to the comparatively high carbon content.

The quenching may be implemented, for example, by introducing the heated chain element into an oil bath or a salt bath. Depending on the selection of the quenching medium the quenching may take place down to different temperatures. The chain element is typically quenched to a temperature in the range between 0° C. and 400° C., in particular between 25° C. and 300° C.

In principle, different properties of the chain element to be manufactured may be implemented by changing and setting certain process parameters during the course of individual or multiple steps of the method according to the present invention. In particular, the layer thickness, the structure homogeneity, etc. of the core layer or the peripheral layer may be varied in a targeted manner.

In principle, all embodiments of the chain element according to the present invention apply similarly to the method according to the present invention and vice versa.

BRIEF DESCRIPTION OF THE DRAWINGS

One exemplary embodiment of the invention is illustrated in the drawing and explained in greater detail below.

DETAILED DESCRIPTION

Figure 1:
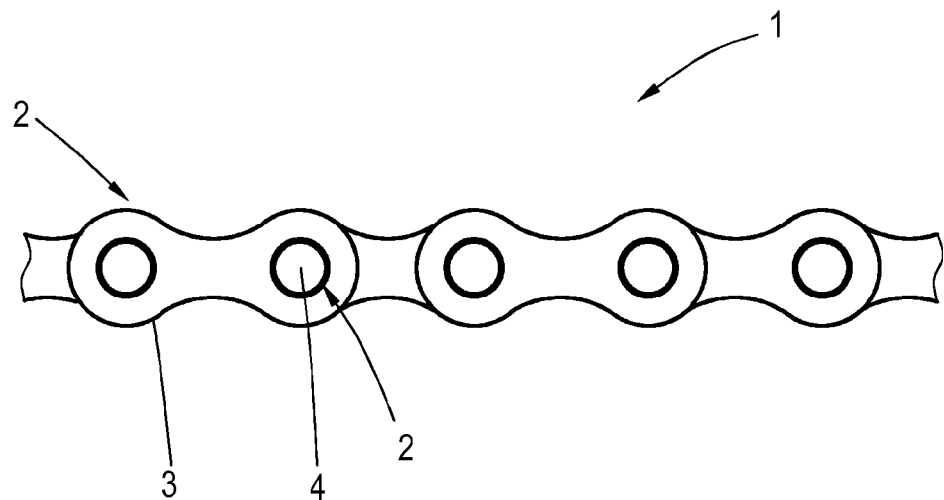
FIG. 1 shows a characteristic detail of a chain, which includes multiple chain elements according to one exemplary embodiment of the present invention.

FIG. 1 shows a characteristic detail of a chain 1. Chain 1 is formed from multiple interconnected chain elements 2. It is apparent that chain 1 therefore includes multiple chain elements 2 in the form of consecutively situated, in particular link-shaped, chain plates 3, which are interconnected with the aid of chain studs 4. Chain 1 may be designed as a tooth chain and thus be used, for example, to transmit power in the powertrain or as part of the powertrain of a motor vehicle.

Figure 2:
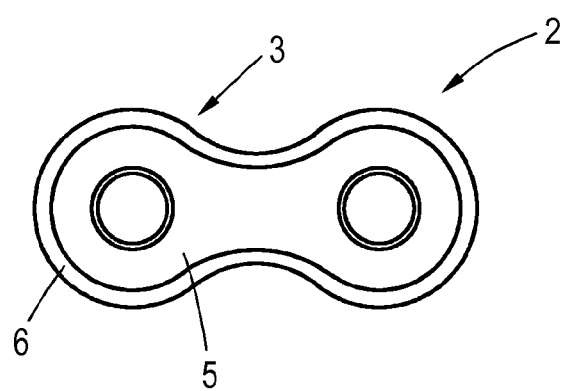
FIG. 2 shows a chain element in the form of a chain plate according to one exemplary embodiment of the present invention.

FIG. 2 shows a separate representation of a chain element 2 in the form of a chain plate 3, which, mounted in a chain 1, is interspersed with chain studs 4 via bores provided therein, and is connected in this way to another chain plate 3. The representation illustrated in FIG. 2 is a longitudinal sectional view of chain element 2.

Chain element 2 is originally made of a metallic material based on carbon and iron, i.e., a steel such as CK75. It is apparent that finished chain element 2 illustrated in FIG. 2 includes a core layer 5 as well as a peripheral layer 6 surrounding the core layer.

Core layer 5 and peripheral layer 6 are distinguished from each other by their structural conditions and their mechanical properties resulting therefrom, in particular the hardness, ductility and toughness. Core layer 5 has a structure made of a ferritic matrix and a martensitic hard phase distributed therein, so that the structure of core layer 5 corresponds to the structure of a dual-phase steel. Core layer 5 thus lends chain element 2, in particular, a certain ductility, strength and toughness.

In contrast, peripheral layer 6 only has a martensitic structure. Peripheral layer 6 is thus formed from martensite, which lends it and chain element 2 a great hardness. The hardness of peripheral layer 6 is approximately 1,200 HV (Vickers hardness). The layer thickness of peripheral layer 6 is, for example, approximately 15 μm.

Figure 3:
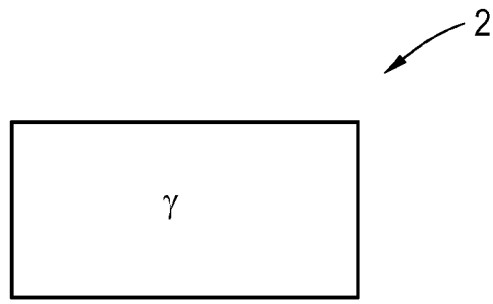
FIGS. 3 through 5 show the method steps for manufacturing a chain element according to one exemplary embodiment of the present invention.
Figure 4:
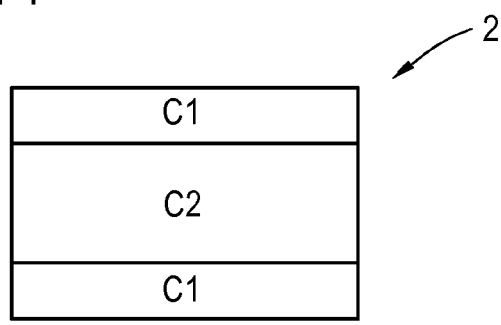
Figure 5:
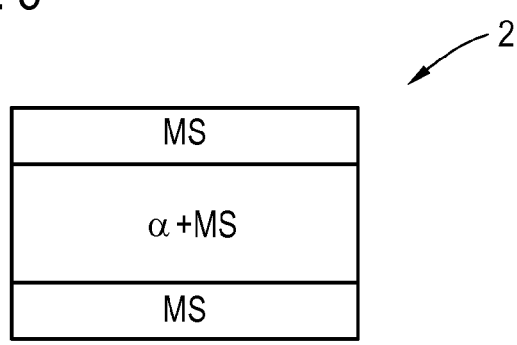

FIGS. 3 through 5 show the essential method steps during the course of manufacturing a chain element 2, as illustrated, for example, in FIGS. 1 and 2, according to one exemplary embodiment of the present invention.

In the method step illustrated in FIG. 3, a previously provided chain element 2, which is made of a steel, is heated to a temperature above the austenitization temperature of the material forming chain element 2, i.e., typically to more than 830° C., and held there for a certain period of time, e.g., half an hour. Both the temperature and the holding period may vary, in particular as a function of the specific chemical composition of provided chain element 2 or the desired properties of chain element 2 to be manufactured.

Heating chain element 2 to a temperature above the austenitization temperature and holding chain element 2 at this temperature induces the formation of a uniform austenitic structure (γ phase, as indicated by the letter γ in FIG. 3).

In the method step illustrated in FIG. 4, at least one measure is carried out for introducing at least carbon into areas of chain element 2 near the surface. The carbon is introduced, in particular, diffusively or thermochemically. The carbon may be introduced, e.g., with the aid of carburization or carbonitriding. It is essential for an enrichment of carbon to take place in the surface or in the areas of chain element 2 near the surface, which represents the basis for the subsequent formation of hardened peripheral layer 6 of chain element 2. As indicated by designations C1 and C2, the carbon content is higher (C1) in the areas of chain element 2 near the surface, which are indicated by the dashed lines, than in inner areas of chain element 2 (C2).

In the method step illustrated in FIG. 5, chain element 2 is quenched in an oil bath or a salt bath to a temperature in the range between 25° C. and 300° C. The abrupt cooling of chain element 2 results in the fact that a core layer 5 is formed, which has a structure made of a ferritic matrix (α phase, as indicated by the letter α in FIG. 5) and includes at least one martensitic hard phase distributed therein in the manner of islands (as indicated by the letters (MS) in FIG. 5) as well as a hardened peripheral layer 6, which has a martensitic structure MS.

The formation of different structures between core layer 5 and peripheral layer 6, due to the quenching, is caused, as mentioned, by the prior enrichment with carbon of the areas of chain element 2 near the surface which form peripheral layer 6, so that a martensitic transformation takes place particularly favorably, due to the high carbon content.

The quenching may take place, for example, by introducing the chain element into an oil bath or a salt bath. Depending on the selection of the quenching medium the quenching may take place down to different temperatures. The chain element is typically quenched to a temperature in the range between 0° C. and 400° C., in particular between 25° C. and 300° C.

LIST OF REFERENCE NUMERALS 1 chain
2 chain element
3 chain plate
4 chain stud
5 core layer
6 peripheral layer

What is claimed is:

1. A chain element made of a carbon-containing material, the chain element comprising:
   a core layer having a structure made of a ferritic matrix with at least one hard phase distributed therein; and
   a hardened peripheral layer having a martensitic structure.

2. The chain element as recited in claim 1 wherein the martensitic structure of the hardened peripheral layer includes martensite.

3. The chain element as recited in claim 1 wherein the martensitic structure of the hardened peripheral layer consists of martensite.

4. The chain element as recited in claim 1 wherein the hardened peripheral layer is formed with the aid of a martensitic transformation of at least the areas of the chain element near the surface.

5. The chain element as recited in claim 1 wherein the hard phase distributed in the core layer includes martensite.

6. The chain element as recited in claim 1 wherein the hard phase distributed in the core layer consists of martensite.

7. The chain element as recited in claim 1 wherein the hardened peripheral layer has a hardness of 600 HV to 1,800 HV.

8. The chain element as recited in claim 7 wherein the hardened peripheral layer has a hardness of more than 1,000 HV.

9. The chain element as recited in claim 1 wherein the chain element is a chain link or a chain sleeve or a chain stud.

10. The chain element as recited in claim 1 wherein the carbon-containing material is steel.

11. A transmission chain of a chain drive comprising the chain element as recited in claim 1.

12. The chain element as recited in claim 1 wherein the hard phase is no more than 20% of the core layer.

13. The chain element as recited in claim 2 wherein the martensitic structure is no more than 20% of the core layer.

* * * * *